United States Patent
Yoshiiri et al.

(10) Patent No.: US 8,606,489 B2
(45) Date of Patent: Dec. 10, 2013

(54) IGNITION TIMING CONTROL SYSTEM FOR INTERNAL COMBUSTION ENGINE

(75) Inventors: Masayuki Yoshiiri, Wako (JP); Jiro Takagi, Wako (JP); Hirotaka Komatsu, Wako (JP); Kazuhiko Hirota, Wako (JP); Atsushi Kurauchi, Wako (JP); Natsuko Kitamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 234 days.

(21) Appl. No.: 13/144,978

(22) PCT Filed: Jan. 28, 2010

(86) PCT No.: PCT/JP2010/051159
§ 371 (c)(1),
(2), (4) Date: Jul. 18, 2011

(87) PCT Pub. No.: WO2010/092876
PCT Pub. Date: Aug. 19, 2010

(65) Prior Publication Data
US 2011/0282562 A1 Nov. 17, 2011

(30) Foreign Application Priority Data

Feb. 12, 2009 (JP) .................. 2009-029242

(51) Int. Cl.
*G06F 19/00* (2011.01)
*G06G 7/70* (2006.01)

(52) U.S. Cl.
USPC ..................... 701/111; 123/406.21

(58) Field of Classification Search
USPC ............ 123/406.2–406.24, 406.29, 123/406.33–406.36; 701/111
See application file for complete search history.

(56) References Cited

U.S. PATENT DOCUMENTS 4,483,295 A * 11/1984 Iida ........................ 123/406.21
6,725,149 B2 * 4/2004 Wada et al. .................... 701/115
(Continued)

FOREIGN PATENT DOCUMENTS

EP 1862670 A1 12/2007
JP 3-145573 6/1991
(Continued)

OTHER PUBLICATIONS

Supplementary EP Search Report for Corresponding EP Application No. 10 74 1155, Dated Aug. 9, 2012.

*Primary Examiner* — Stephen K Cronin
*Assistant Examiner* — Joseph Dallo
(74) *Attorney, Agent, or Firm* — Squire Sanders (US) LLP

(57) ABSTRACT

An ignition timing control system for an internal combustion engine, for controlling an ignition timing of the engine, is provided. A charging efficiency of the engine is calculated according to the intake air flow rate and the engine rotational speed which are detected, and a knock limit ignition timing is calculated according to the engine rotational speed and the charging efficiency. A knock correction value is calculated according to the knocking detection result by a knock sensor, and a learning parameter table, in which first and second learning parameters are set, is updated based on the engine rotational speed and the knock correction value when the knocking is detected. The learning parameter table is retrieved according to the engine rotational speed, to calculate the first and second learning parameters. Each-cylinder correction values are calculated corresponding respectively to a plurality of cylinders of the engine using the charging efficiency, the first learning parameter, and the second learning parameter and the ignition timing of the engine is controlled using the knock limit ignition timing and the each-cylinder correction value.

15 Claims, 11 Drawing Sheets

(56) References Cited

U.S. PATENT DOCUMENTS

| | | | |
|---|---|---|---|
| 6,725,650 B2 * | 4/2004 | Nishimura | 60/285 |
| 7,121,260 B2 * | 10/2006 | Miyanoo et al. | 123/406.26 |
| 7,831,377 B2 * | 11/2010 | Akazaki et al. | 701/111 |
| 8,024,107 B2 * | 9/2011 | Mizuno et al. | 701/111 |
| 2007/0277780 A1 * | 12/2007 | Akazaki et al. | 123/406.22 |
| 2009/0164099 A1 * | 6/2009 | Suzuki et al. | 701/103 |
| 2009/0217906 A1 * | 9/2009 | Nishimoto et al. | 123/348 |
| 2010/0037859 A1 * | 2/2010 | Mashiki | 123/406.33 |

FOREIGN PATENT DOCUMENTS

| | | |
|---|---|---|
| JP | 9-68146 | 3/1997 |
| JP | 4068680 | 1/2008 |
| WO | 2008029212 A1 | 3/2008 |

* cited by examiner

IGNITION TIMING CONTROL SYSTEM FOR INTERNAL COMBUSTION ENGINE

TECHNICAL FIELD

The present invention relates to an ignition timing control system for an internal combustion engine, and particularly to an ignition timing control system using a charging efficiency of the engine as a parameter indicative of a load on the engine.

BACKGROUND ART

Patent Document 1 (shown below) discloses a control system which performs an engine control using the charging efficiency of the engine as a parameter indicative of the engine load. According to this control system, an engine control parameter, for example, a basic ignition timing is calculated by retrieving a map according to the engine rotational speed and the charging efficiency, and the basic ignition timing is corrected in the transient operating condition of the engine to perform the ignition timing control.

PRIOR ART DOCUMENT

Patent Document

Patent Document 1: Japanese Patent Publication No. 4068680

SUMMARY OF THE INVENTION

Problems to be Solved by the Invention

In the system shown in Patent Document 1, characteristic variations in a plurality of engines or changes in the engine characteristic due to aging with respect to the optimal ignition timing characteristic depending on the charging efficiency are not taken into consideration. Therefore, if the basic ignition timing map which is set upon designing the control system is applied to all of the mass-produced engines, the actual ignition timing may deviate from the optimal value for the controlled-object engine. Further, if the ignition timing characteristic has changed due to aging, the same problem occurs.

The present invention was made contemplating the above described point, and an objective of the invention is to provide an ignition timing control system for an internal combustion engine, which can appropriately set the ignition timing when the ignition timing set according to the charging efficiency deviates from the optimal value due to characteristic variations in a plurality of engines or aging changes.

To attain the above objective, the present invention provides an ignition timing control system for an internal combustion engine, for controlling an ignition timing of the engine. The ignition timing control system is characterized by comprising: intake air flow rate detecting, means for detecting an intake air flow rate (GAIR) of the engine; rotational speed detecting means for detecting a rotational speed (NE) of the engine: charging efficiency calculating means for calculating a charging efficiency ($\eta c$) of the engine according to the intake air flow rate (GAIR) and the engine rotational speed (NE) which are detected; knock limit ignition timing calculating means for calculating a knock limit ignition timing (IGINI) according to the engine rotational speed (NE) and the charging efficiency ($\eta c$); knocking detecting means for detecting a knocking of the engine; knock correction value calculating means for calculating a knock correction value (IGKNOCK) according to the detected result by the knocking detecting means; learning means for updating a learning parameter table based on the engine rotational speed (NE) and the knock correction value (IGKNOCK) when the knocking is detected, wherein first and second learning parameters (a, b) are set in the learning parameter table; learning parameter calculating means for retrieving the learning parameter table according to the engine rotational speed (NE), to calculate the first and second learning parameters (a, b); each-cylinder correction value calculating means for calculating each-cylinder correction values (DIGRLS) corresponding respectively to a plurality of cylinders of the engine using the charging efficiency ($\eta c$), the first learning parameter (a), and the second learning parameter (b); and ignition timing calculating means for calculating an ignition timing (IGLOG) of the engine using the knock limit ignition timing (IGINI) and the each-cylinder correction value (DIGRLS).

With this configuration, the charging efficiency is calculated according to the intake air flow rate and the engine rotational speed, and the knock limit ignition timing is calculated according to the engine rotational speed and the charging efficiency. Further, the knocking occurred in the engine is detected and the knock correction value is calculated according to the detected result. The learning parameter table, in which the first and second learning parameters are set, is updated based on the engine rotational speed and the knock correction value when the knocking is detected. The first and second learning parameters are calculated by retrieving the learning parameter table according to the engine rotational speed. The each-cylinder correction values respectively corresponding to the plurality of cylinders of the engine are calculated using the charging efficiency, the first learning parameter, and the second learning parameter. The ignition timing of the engine is calculated using the knock limit ignition timing and the each-cylinder correction value. Therefore, the learning parameter table, in which the first and second learning parameters are set, is updated according to the state of knocking occurrence, so that differences in the knock limit ignition timing among a plurality of cylinders or engines, or changes in the knock limit ignition timing due to aging are reflected in the first and second learning parameters. Consequently, the ignition timing can appropriately be set regardless of the differences or aging changes in the knock limit ignition timing so that the knocking is always suppressed.

Preferably, the each-cylinder correction value calculating means calculates the each-cylinder correction value (DIGRLS) by applying a difference ($\eta cx$) between the charging efficiency ($\eta c$) and a reference value ($\eta cREF$) of the charging efficiency, to a linear expression containing the first and second learning parameters (a, b).

With this configuration, the each-cylinder correction value is calculated by applying the difference between the charging efficiency and the reference value of the charging efficiency to the linear expression containing the first and second learning parameters. It is confirmed that the influence due to the differences or aging changes tends to be greater as the charging efficiency decreases under the condition where the engine rotational speed is constant, and the each-cylinder correction value for correcting the differences or aging changes can be calculated using the linear expression of the difference between the charging efficiency and its reference value. Therefore, by calculating the first and second learning parameters as two parameters (a coefficient and an adding term) which define the linear expression, and using the linear expression containing the calculated first and second learning parameters, a proper value of the each-cylinder correction value can be obtained.

Preferably, the reference value (ηcREF) is set to a value greater than 100%. The charging efficiency calculated during the engine operation may reach a value near 100%. If the reference value is set to 100%, the values of the learning parameters may greatly deviates from proper values when the charging efficiency takes a great value at the beginning of learning the learning parameters. Therefore, by setting the reference value of the charging efficiency to a value greater than 100%, it is possible to maintain the learning parameter values at the proper values especially at the beginning of the learning.

Preferably, the knock limit ignition timing calculating means includes: basic knock limit ignition timing calculating means for calculating a basic knock limit ignition timing (IGKBASE) according to the charging efficiency (c); and rotational speed correction value calculating means for calculating a rotational speed correction value (DIGKNE) according to the engine rotational speed (NE), wherein the knock limit ignition timing calculating means calculates the knock limit ignition timing (IGINI) by correcting the basic knock limit ignition timing (IGKBASE) with the rotational speed correction value (DIGKNE).

With this configuration, the basic knock limit ignition timing is calculated according to the charging efficiency, the rotational speed correction value is calculated according to the engine rotational speed, and the knock limit ignition timing is calculated by correcting the basic knock limit ignition timing with the rotational speed correction value. Therefore, the knock limit ignition timing can be calculated using two tables (a table in which the basic knock limit ignition timing set according to the charging efficiency, and a table in which the rotational speed correction value is set according to the engine rotational speed), without using the map set according to the charging efficiency and the engine rotational speed. Consequently, the manpower required for setting the map is reduced.

Preferably, the engine has a valve operating characteristic varying mechanism (42) for continuously varying an operating phase of at least one intake valve of the engine, and the knock limit ignition timing calculating means includes: basic knock limit ignition timing calculating means for calculating a basic knock limit ignition timing (IGKBASE) according to the charging efficiency (ηc); rotational speed correction value calculating means for calculating a rotational speed correction value (DIGKNE) according to the engine rotational speed (NE); inclination coefficient calculating means for calculating an inclination coefficient (KIGKVTC) according to the charging efficiency (ηc) and the engine rotational speed (NE); and operating phase correction value calculating means for calculating an operating phase correction value (DIGKVTC) by multiplying an operating phase (VTC) of the at least one intake valve by the inclination coefficient (KIGKVTC), wherein the knock limit ignition timing calculating means calculates the knock limit ignition timing (IGINI) by correcting the basic knock limit ignition timing (IGKBASE) with the rotational speed correction value (DIGKNE) and the operating phase correction value (DIGKVTC).

With this configuration, the basic knock limit ignition timing is calculated according to the charging efficiency, the rotational speed correction value is calculated according to the engine rotational speed, and the inclination coefficient is calculated according to the charging efficiency and the engine rotational speed. Further the operating phase of the intake valve is multiplied by the inclination coefficient, to calculate the operating phase correction value, and the basic knock limit ignition timing is corrected with the rotational speed correction value and the operating phase correction value to calculate the knock limit ignition timing. That is, it is possible to calculate the knock limit ignition timing using two tables and one map (an inclination coefficient map). Therefore, the control accuracy can be maintained without setting a plurality of basic knock limit ignition timing maps corresponding to a plurality of operating phases of the intake valve. Consequently, the manpower required for setting maps is greatly reduced.

MODE FOR CARRYING OUT THE INVENTION

Preferred embodiments of the present invention will now be described with reference to the drawings.

Figure 1:
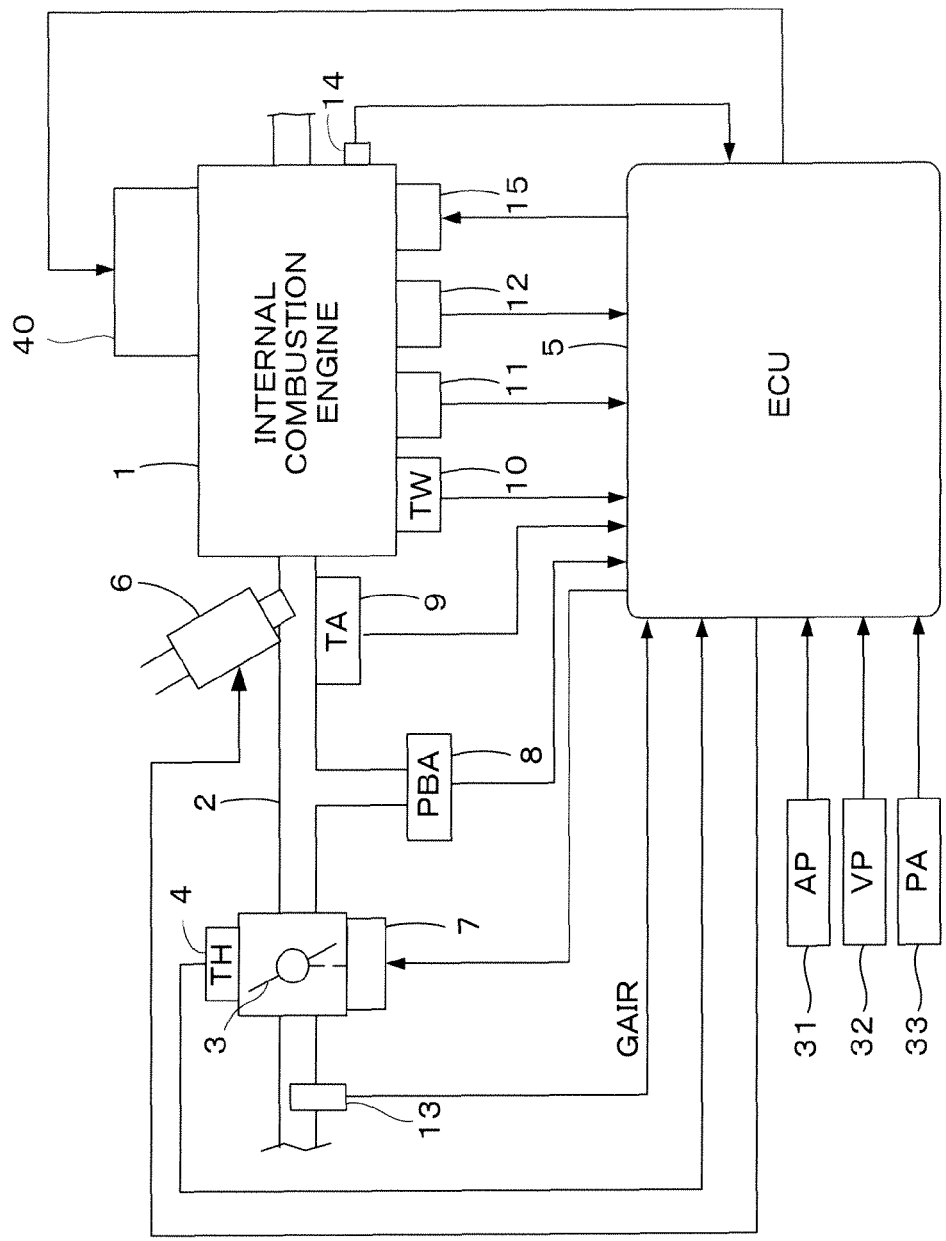
FIG. 1 is a schematic diagram showing a configuration of an internal combustion engine and a control system therefor according to one embodiment of the present invention.
Figure 2:
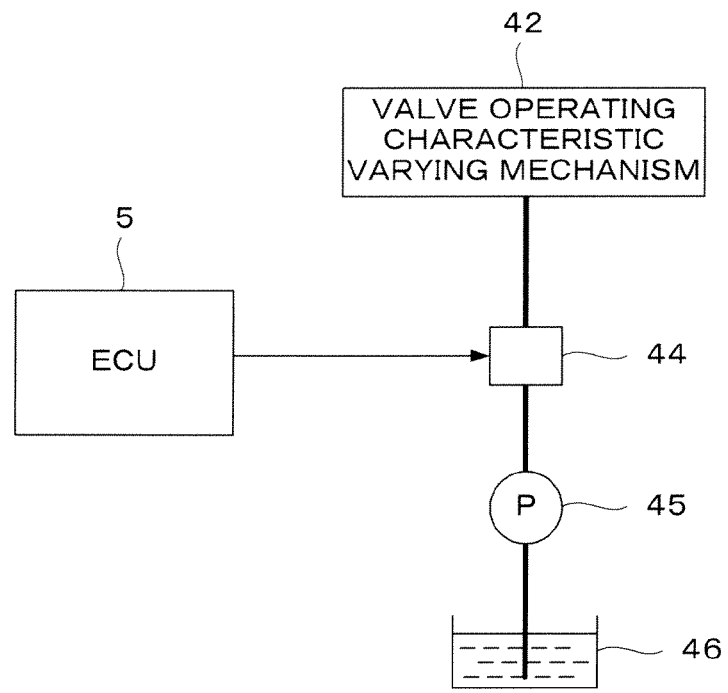
FIG. 2 is a diagram showing a configuration of a valve operating characteristic varying device shown in FIG. 1.

FIG. 1 is a schematic diagram showing a configuration of an internal combustion engine and a control system therefor according to one embodiment of the present invention. FIG. 2 is a schematic diagram showing a configuration of a valve operating characteristic varying device. Referring to FIG. 1, an internal combustion engine (hereinafter referred to as "engine") 1 having, for example, four cylinders is provided with intake valves, exhaust valves, and cams for driving the intake valves and the exhaust valves. The engine 1 is provided with a valve operating characteristic varying device 40 having a valve operating characteristic varying mechanism 42 as a cam phase varying mechanism for continuously varying the operating phase of the cams for driving the intake valves with reference to a rotational angle of the crank shaft of the engine 1. The valve operating characteristic varying mechanism 42 varies the operating phase of the cam for driving each intake valve, and consequently varies the operating phase of each intake valve.

The engine 1 has an intake pipe 2 provided with a throttle valve 3. A throttle valve opening (TH) sensor 4 is connected to the throttle valve 3. The throttle valve opening sensor 4 outputs an electrical signal corresponding to an opening of the throttle valve 3, and supplies the electrical signal to an electronic control unit (referred to as "ECU") 5. An actuator 7 for actuating the throttle valve 3 is connected to the throttle valve 3, and the operation of the actuator 7 is controlled by the ECU 5.

An intake air flow rate sensor 13 for detecting an intake air flow rate GAIR of the engine 1 is disposed in the intake pipe 2. The detection signal of the intake air flow rate sensor 13 is supplied to the ECU 5.

Fuel injection valves 6 are inserted into the intake pipe 2 at locations intermediate between the cylinder block of the engine 1 and the throttle valves 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

A spark plug 15 of each cylinder of the engine 1 is connected to the ECU 5. The ECU 5 supplies an ignition signal to each spark plug 15 and controls the ignition timing.

An intake pressure sensor 8 for detecting an intake pressure PBA and an intake air temperature sensor 9 for detecting an intake air temperature TA are disposed downstream of the throttle valve 3. Further, an engine coolant temperature sensor 10 for detecting an engine coolant temperature TW is mounted on the body of the engine 1. The detection signals from these sensors are supplied to the ECU 5.

A crank angle position sensor 11 and a cam angle position sensor 12 are connected to the ECU 5. The crank angle position sensor 11 is provided to detect a rotational angle of a crankshaft (not shown) of the engine 1, and the cam angle position sensor 12 is provided to detect a rotational angle of the camshaft to which the cams for driving the intake valves of the engine 1 are fixed. A signal corresponding to the rotational angle detected by the crank angle position sensor 11 and a signal corresponding to the rotational angle detected by the cam angle position sensor 12 are supplied to the ECU 5. The crank angle position sensor 11 generates one pulse (hereinafter referred to as "CRK pulse") at every constant crank angle period (e.g., a period of 30 degrees) and a pulse for specifying a predetermined angle position of the crankshaft. The cam angle position sensor 12 generates a pulse at a predetermined crank angle position for a specific cylinder of the engine 1 (this pulse will be hereinafter referred to as "CYL pulse"). The cam angle position sensor 12 further generates a pulse at a top dead center (TDC) starting the intake stroke in each cylinder (this pulse will be hereinafter referred to as "TDC pulse"). These pulses are used to control the various timings such as a fuel injection timing and the ignition timing, as well as to detect an engine rotational speed NE. An actual operating phase CAIN of the camshaft is detected based on the correlation between the TDC pulse output from the cam angle position sensor 12 and the CRK pulse output from the crank angle position sensor 11.

A knock sensor 14 for detecting a high frequency vibration is mounted on a proper position of the engine 1. The detection signal of the knock sensor 14 is supplied to the ECU 5. Further, an accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (the depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The valve operating characteristic varying device 40, as shown in FIG. 2, includes a valve operating characteristic varying mechanism 42 and a solenoid valve 44. The valve operating characteristic varying mechanism 42 continuously varies an operating phase of each intake valve. An opening of the solenoid valve 44 is continuously varied to change the operating phase of each intake valve. A valve operating phase VTC calculated from the operating phase CAIN of the camshaft is used as a parameter indicative of the operating phase of the intake valve. A lubricating oil in an oil pan 46 is pressurized by an oil pump 45, and supplied to the solenoid valve 44. It is to be noted that a specific configuration of the valve operating characteristic varying mechanism 42 is described, for example, in Japanese Patent Laid-open No. 2000-227013.

Figure 3:
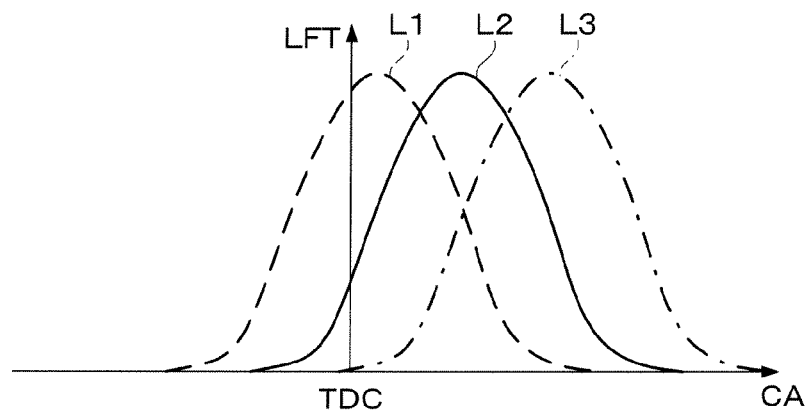
FIG. 3 is a diagram showing an operating characteristic of an intake valve.

According to the valve operating characteristic varying mechanism 42, the intake valve is driven with a phase from the most advanced phase shown by the broken line L1 in FIG. 3 to the most retarded phase shown by the dot-and-dash line L3, depending on a change in the operating phase CAIN of the camshaft. In FIG. 3, the characteristic shown by the solid line L2 is the center of the variable phase range. In this embodiment, the valve operating phase VTC is defined as an advancing angular amount from the most retarded phase.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, and the solenoid valve 44.

The CPU in the ECU 5 controls an ignition timing, an opening of the throttle valve 3, an amount of fuel to be supplied to the engine 1 (the opening period of each fuel injection valve 6), and the valve operating characteristic through the solenoid valve 44, according to the detection signals from the above-described sensors.

Figure 4:
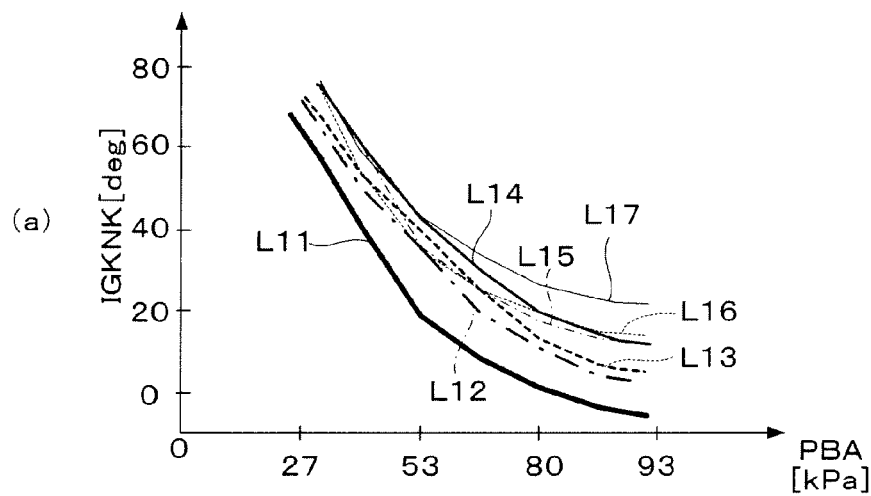
FIG. 4 is a diagram for illustrating a relationship between a knock limit ignition timing (IGKNK) and a charging efficiency (ηc).
Figure 4:
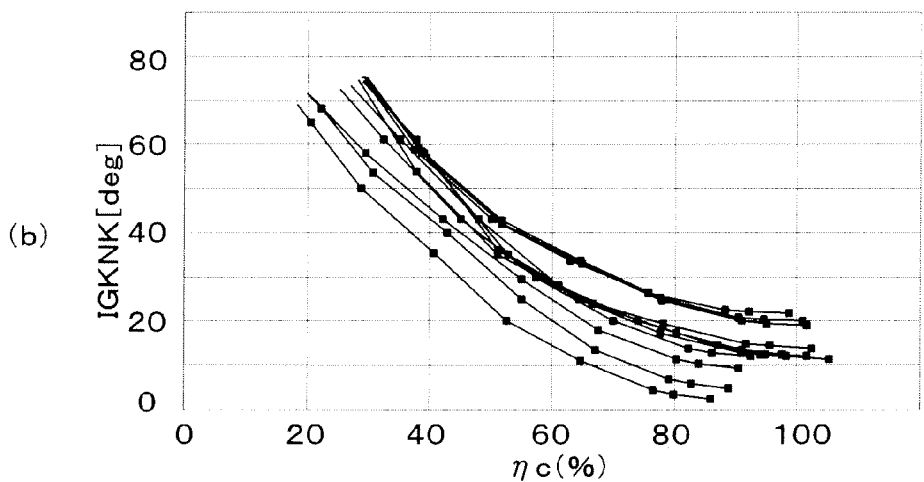
Figure 4:
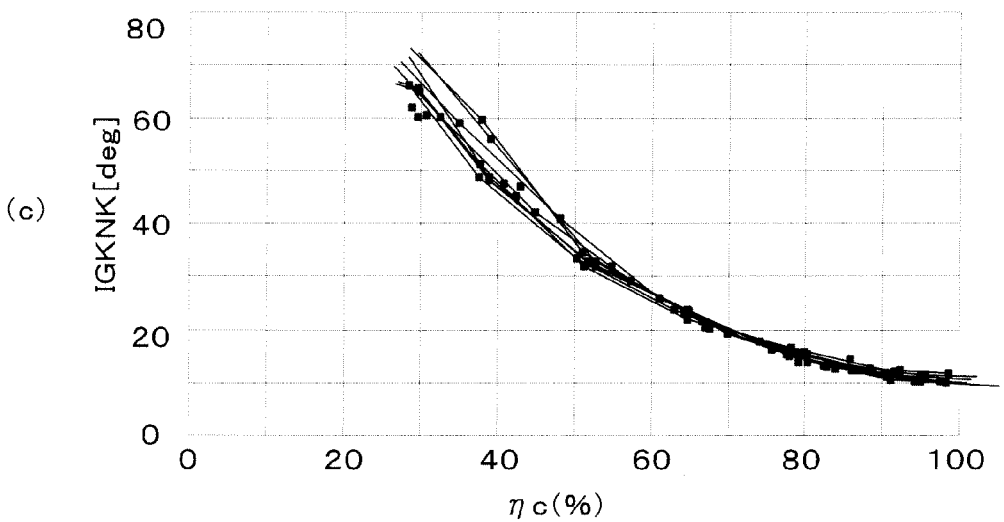

FIG. 4 is a diagram for illustrating a calculation method of the knock limit ignition timing IGKNK in this embodiment. The knock limit ignition timing IGKNK is an ignition timing corresponding to the minimum value (the most retarded value) of the ignition timing range wherein a possibility of occurrence of the knocking is high. The ignition timing IGLOG is set to a value which is equal to or less than the knock limit ignition timing IGKNK, i.e., a value which is equal to or retarded from the knock limit ignition timing IGKNK.

In the conventional system, a method in which the knock limit ignition timing IGKNK is calculated using a knock limit ignition timing map set according to the engine rotational speed NE and the intake pressure PBA as shown in FIG. 4(a), is adopted. In FIG. 4(a), the thick solid line L11, the dot-and-dash line L12, the broken line L13, the solid line L14, the thin dot-and-dash line L15, the thin broken line L16, and the thin solid line L17 respectively correspond to the engine rotational speeds NE of 1000, 1500, 2000, 3000, 4000, 5000, and 6500 rpm (the lines are actually set at intervals of 500 rpm, but some of the lines are omitted for simplifying the graph). According to the method using the map shown in FIG. 4(a), it is necessary to set the knock limit ignition timing map with respect to all of the typical operating phases of the intake valve of the engine wherein the operating phase of the intake valves is continuously varied.

FIG. 4(b) is obtained by converting the map shown in FIG. 4(a) to a map which is set according to the engine rotational speed NE and the charging efficiency ηc (this map contains the lines corresponding to the engine rotational speeds which are omitted in FIG. 4(a)). The changing characteristics of all lines in FIG. 4(b) are similar to each other. Therefore, by moving the lines in FIG. 4(b) upwards or downwards so that each line passes the point of [ηc: 70% and IG: 20 degrees], FIG. 4(c) is obtained. According to FIG. 4(c), it is confirmed that the characteristic shown by one line can be used in the region where the charging efficiency ηc is equal to or greater than 50% and the knock limit ignition timing is comparatively small.

Therefore, in this embodiment, an IGKBASE table and a DIGKNE table are used to calculate the knock limit ignition timing. In the IGKBASE table, the knock limit ignition timing shown in FIG. 4(c) is set as a basic knock limit ignition timing IGKBASE. In the DIGKNE table, a rotational speed correction value DIGKNE is set according to the engine rotational speed NE. The basic knock limit ignition timing IGKBASE is calculated according to the charging efficiency ηc using the IGKBASE table, the rotational speed correction value DIGKNE is calculated according to the engine rotational speed using the DIGKNE table, and the knock limit ignition timing is calculated by adding the basic knock limit ignition timing IGKBASE and the rotational speed correction value DIGKNE.

Figure 5:
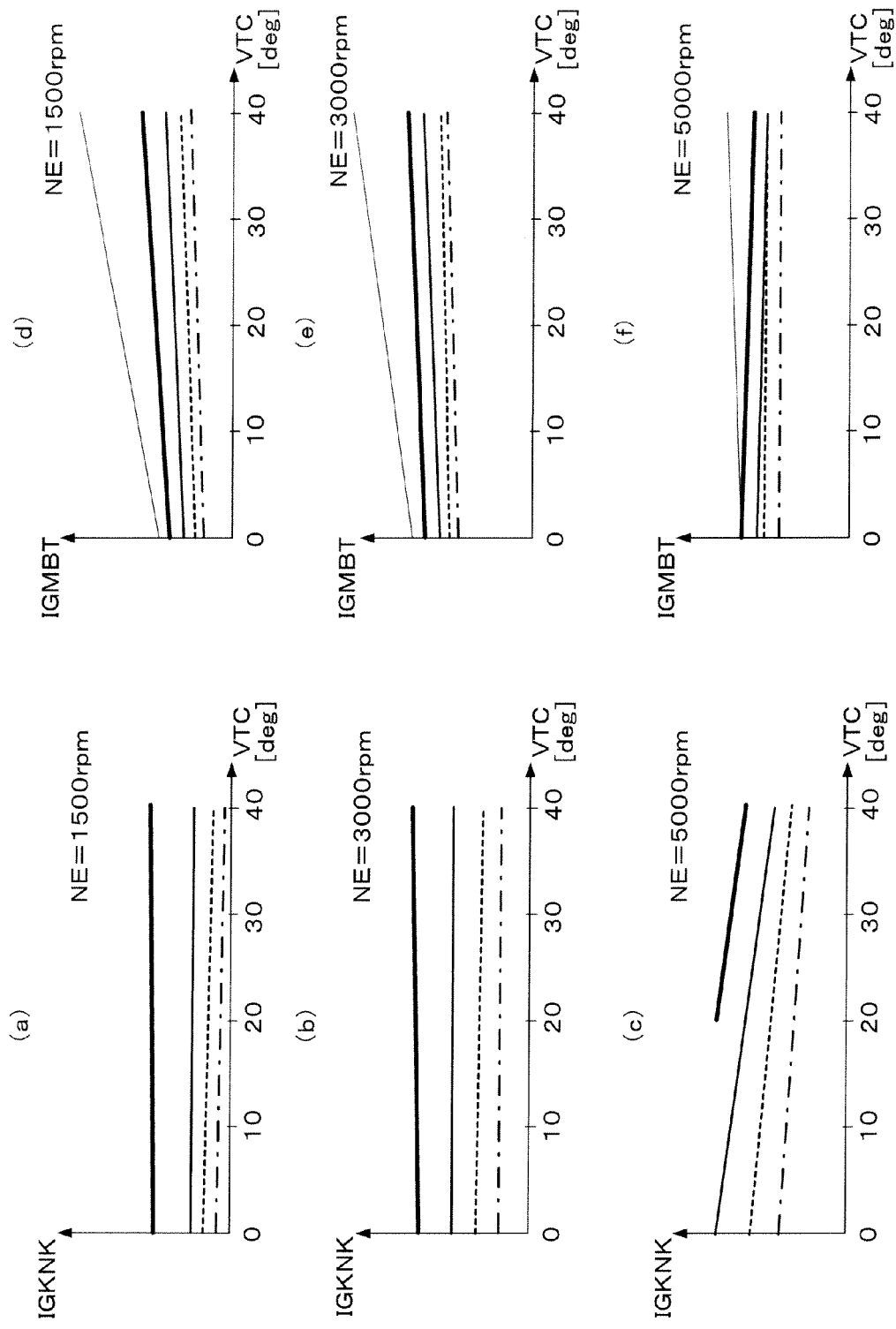
FIG. 5 is a diagram showing relationships between an operating phase (VTC) of the intake valve and the knock limit ignition timing (IGKNK) and relationships between the operating phase (VTC) and an optimal ignition timing (IGMBT).

FIGS. 5(a) to 5(c) show relationships between the valve operating phase VTC and the knock limit ignition timing IGKNK. FIGS. 5(a) to 5(c) respectively corresponds to the engine rotational speeds NE of 1500, 3000, and 5000 rpm. The solid lines of middle thickness, the broken lines, and the dot-and-dash lines shown in FIGS. 5(a) to 5(c) respectively correspond to the states where the charging efficiency ηc is 60%, 70%, and 80%. The thick solid line in FIG. 5(a) corresponds to the state where the charging efficiency ηc is 45%, and the thick solid lines in FIGS. 5(b) and 5(c) correspond to the state where the charging efficiency ηc is 50%.

As apparent from FIGS. 5(a) to 5(c), the relationship between the valve operating phase VTC and the knock limit ignition timing IGKNK is indicated as a straight line, if the engine rotational speed NE and the charging efficiency ηc are constant. That is, the relationship between the valve operating phase VTC and the knock limit ignition timing IGKNK can be approximated with a straight line if the charging efficiency ηc and the engine rotational speed NE are constant. Therefore, in this embodiment, the valve operating phase VTC is applied to the following equation (1), to calculate an operating phase correction value DIGKVTC. The basic knock limit ignition timing IGKBASE is corrected with the operating phase correction value DIGKVTC.

$$DIGKVTC = VTC \times KIGKVTC \quad (1)$$

where KIGKVTC is an inclination coefficient calculated by retrieving an inclination coefficient map (KIGKVTC map) which are set according to the charging efficiency ηc and the engine rotational speed NE.

By adopting the above-described calculation method, an optimal value of the knock limit ignition timing IGKNK can always be obtained in response to changes in the engine rotational speed NE, the charging efficiency ηc, and the valve operating phase VTC, using two tables and one map. That is, it is not necessary to prepare a plurality of maps (which are set according to the engine rotational speed NE and the charging efficiency ηc) corresponding to a plurality of valve operating phases. Accordingly, it is possible to greatly reduce the manpower required for setting the maps.

Further, FIGS. 5(d) to 5(f) show relationships between an optimal ignition timing IGMBT (an ignition timing at which the engine output torque is maximum) and the valve operating phase VTC. FIGS. 5(d) to 5(f) respectively correspond to the engine rotational speeds NE of 1500, 3000, and 5000 rpm. The solid lines of the middle thickness, the broken lines, and the dot-and-dash lines shown in FIGS. 5(d) to 5(f) respectively correspond to the states where the charging efficiency ηc is 60%, 70%, and 80%. Further, the thick solid lines correspond to the state where the charging efficiency ηc is 45%, and the thin solid lines correspond to the state where the charging efficiency ηc is 30%.

As apparent from FIGS. 5(d) to 5(f), the relationship between the valve operating phase VTC and the optimal ignition timing IGMBT is indicated as a straight line, if the engine rotational speed NE and the charging efficiency ηc are constant. That is, the relationship between the valve operating phase VTC and the optimal ignition timing IGMBT can be approximated with a straight line, if the charging efficiency ηc and the engine rotational speed NE are constant. Therefore, in this embodiment, the valve operating phase VTC is applied to the following equation (2), to calculate the operating phase correction value DIGMVTC. A basic optimal ignition timing IGMBTB is calculated according to the engine rotational speed NE and the charging efficiency ηc, and the basic optimal ignition timing IGMBTB is corrected with the operating phase correction value DIGMVTC.

$$DIGMVTC = VTC \times KIGMVTC \quad (2)$$

where KIGMVTC is an inclination coefficient calculated by retrieving an inclination coefficient map (KIGMVTC map) according to the charging efficiency ηc and the engine rotational speed NE.

Applying the above-described calculation method makes it unnecessary to prepare a plurality of maps, in which the optimal ignition timing IGMBT is set according to the engine rotational speed NE and the charging efficiency ηc, corresponding to a plurality of valve operating phases VTC. Accordingly, the manpower required for setting the maps is reduced.

Figure 6:
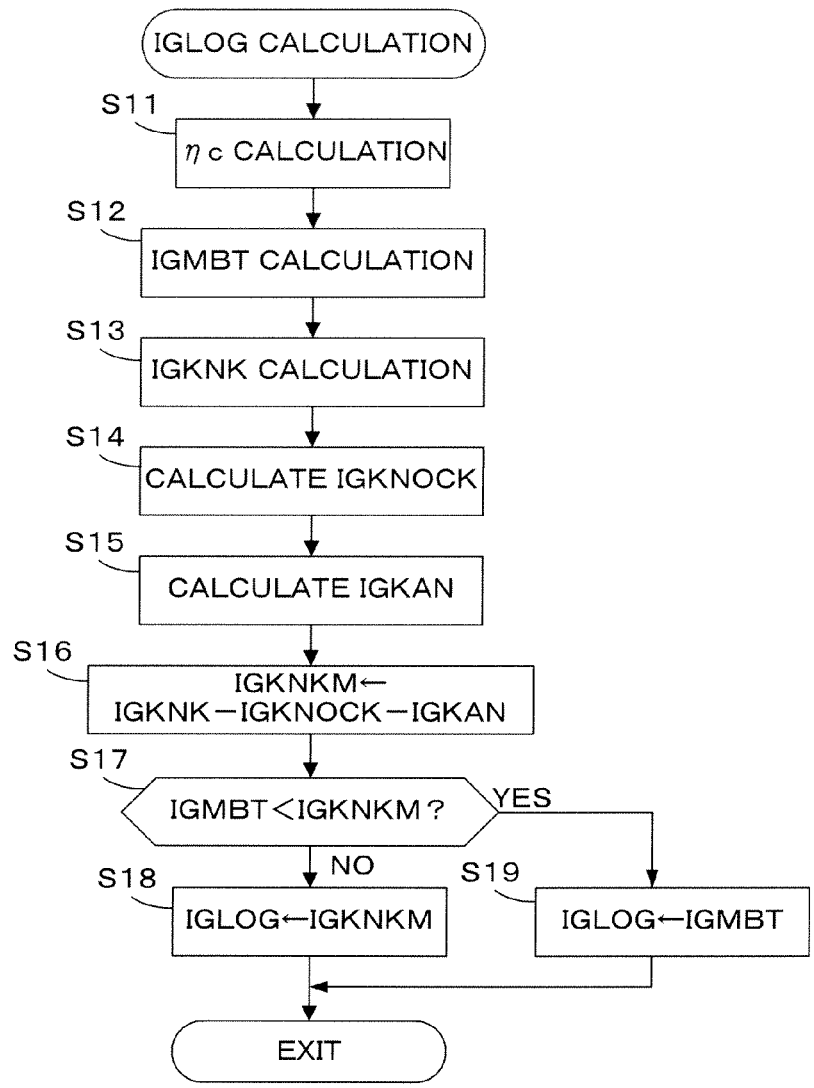
FIG. 6 is a flowchart of a process for calculating an ignition timing (IGLOG).

FIG. 6 is a flowchart of a process for calculating the ignition timing IGLOG indicative of an advancing angular amount of the ignition timing from the compression top dead center. This process is executed by the CPU in the ECU 5 in synchronism with generation of the TDC pulse.

Figure 7:
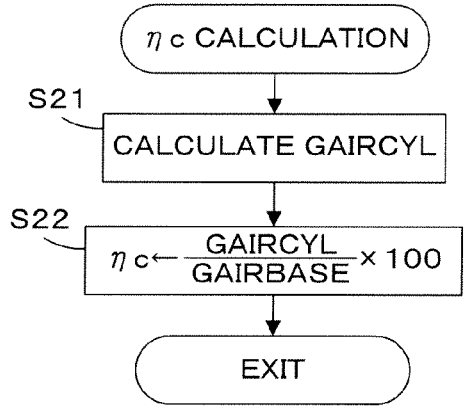
FIG. 7 is a flowchart of a process for calculating the charging efficiency (ηc) in the process of FIG. 6.
Figure 8:
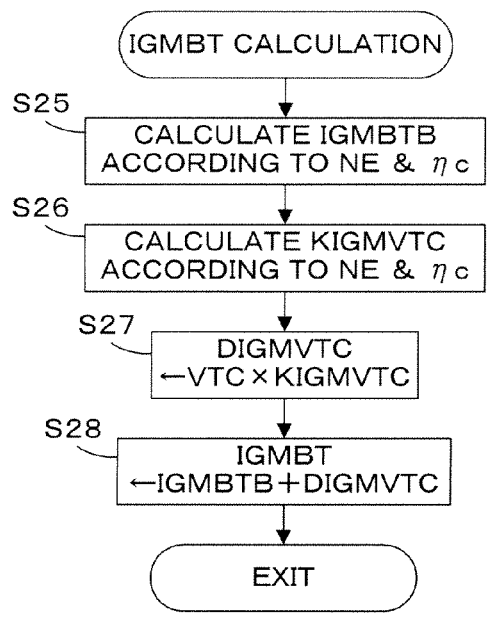
FIG. 8 is a flowchart of a process for calculating the optimal ignition timing (IGMBT) in the process of FIG. 6.

In step S11, an ηc calculation process shown in FIG. 7 is executed to calculate the charging efficiency ηc. In step S12, an IGMBT calculation process shown in FIG. 8 is executed to calculate the optimal ignition timing IGMBT.

Figure 9:
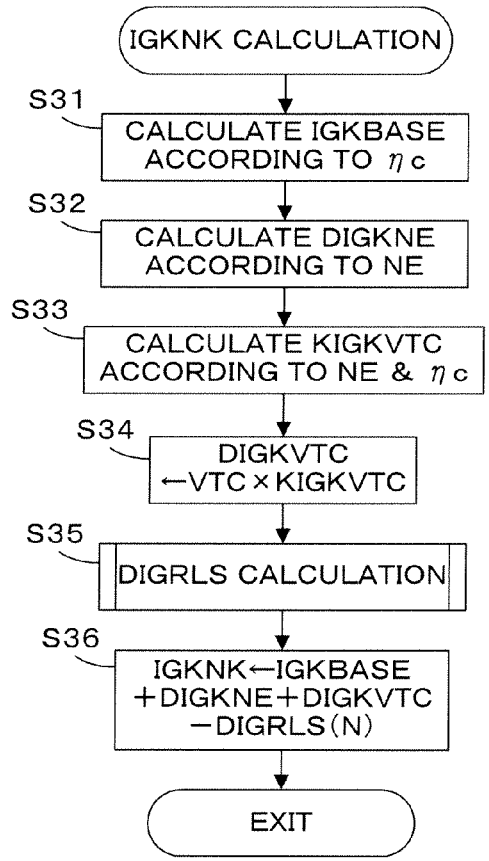
FIG. 9 is a flowchart of a process for calculating the knock limit ignition timing (IGKNK) in the process of FIG. 6.

In step S13, an IGKNK calculation process shown in FIG. 9 is executed to calculate the knock limit ignition timing IGKNK. In step S14, a knock correction value IGKNOCK (a retard correction value which takes a positive value in the retarding direction) is calculated according to the detected result in a knocking detecting process (not shown). Specifically, the knock correction value IGKNOCK is increased by a predetermined incremental amount DIGADD, when the knocking is detected based on the output of the knock sensor 14. The knock correction value IGKNOCK is gradually reduced during the period when the knocking is not detected. Known methods, for example, disclosed in Japanese Patent Laid-open No. 2004-353473, are adopted as the detecting method of the knocking and the calculation method of the knock correction value IGKNOCK.

In step S15, an environment correction value IGKAN (a retard correction value which takes a positive value in the retarding direction) is calculated. Specifically, the environment correction value IGKAN is calculated by adding an intake air temperature correction value IGTA calculated according to the intake air temperature TA, a coolant temperature correction value IGTW calculated according to the engine coolant temperature TW, and an atmospheric pressure correction value IGPA calculated according to the atmospheric pressure PA.

In step S16, the knock limit ignition timing IGKNK, the knock correction value IGKNOCK, and the environment correction value IGKAN are applied to the following equation (3), to calculate a corrected knock limit ignition timing IGKNKM.

$$IGKNKM = IGKNK - IGKNOCK - IGKAN \qquad (3)$$

In step S17, it is determined whether or not the optimal ignition timing IGMBT calculated in step S12 is less than the corrected knock limit ignition timing IGKNKM. If the answer to step S17 is affirmative (YES), the ignition timing IGLOG is set to the optimal ignition timing IGMBT (step S19). On the other hand, if the answer to step S17 is negative (NO), i.e., if IGMBT is equal to or greater than IGKNKM, the ignition timing IGLOG is set to the corrected knock limit ignition timing IGKNKM (step S18).

FIG. 7 is a flowchart of the $\eta c$ calculation process executed in step S11 of FIG. 6.

In step S21, a detected intake air flow rate GAIR [g/sec] is applied to the following equation (4) to calculate an intake air amount GAIRCYL in one intake stroke of one cylinder. KC in the equation (4) is a predetermined conversion coefficient.

$$GAIRCYL = GAIR \times KC/NE \qquad (4)$$

In step S22, the intake air amount GAIRCYL is applied to the following equation (5) to calculate the charging efficiency $\eta c$. GAIRBASE in the equation (5) is an amount of air with which the cylinder volume at the time the piston is at the bottom dead center in the reference atmosphere condition (e.g., pressure: 101.3 kPa, temperature: 20 degrees centigrade, and humidity: 60%) is charged. The air amount GAIRBASE is previously calculated.

$$\eta c = (GAIRCYL/GAIRBASE) \times 100 \qquad (5)$$

FIG. 8 is a flowchart of the IGMBT calculation process executed in step S12 of FIG. 6.

In step S25, an IGMBTB map is retrieved according to the engine rotational speed NE and the charging efficiency $\eta c$, to calculate the basic optimal ignition timing IGMBTB. The IGMBTB map is set so that the basic optimal ignition timing IGMBTB decreases as the charging efficiency $\eta c$ increases. Further, the IGMBTB map is set so that the basic optimal ignition timing IGMBTB increases as the engine rotational speed NE increases in a region where the engine rotational speed NE is comparatively low.

In step S26, the above-described KIGMVTC map is retrieved according to the engine rotational speed NE and the charging efficiency $\eta c$, to calculate a first inclination coefficient KIGMVTC.

In step S27, a first operating phase correction value DIGMVTC is calculated by the above-described equation (2). In step S28, the basic optimal ignition timing IGMBTB and the first operating phase correction value DIGMVTC are applied to the following equation (6), to calculate the optimal ignition timing IGMBT.

$$IGMBT = IGMBTB + DIGMVTC \qquad (6)$$

FIG. 9 is a flowchart of the IGKNK calculation process executed in step S13 of FIG. 6.

Figure 10:
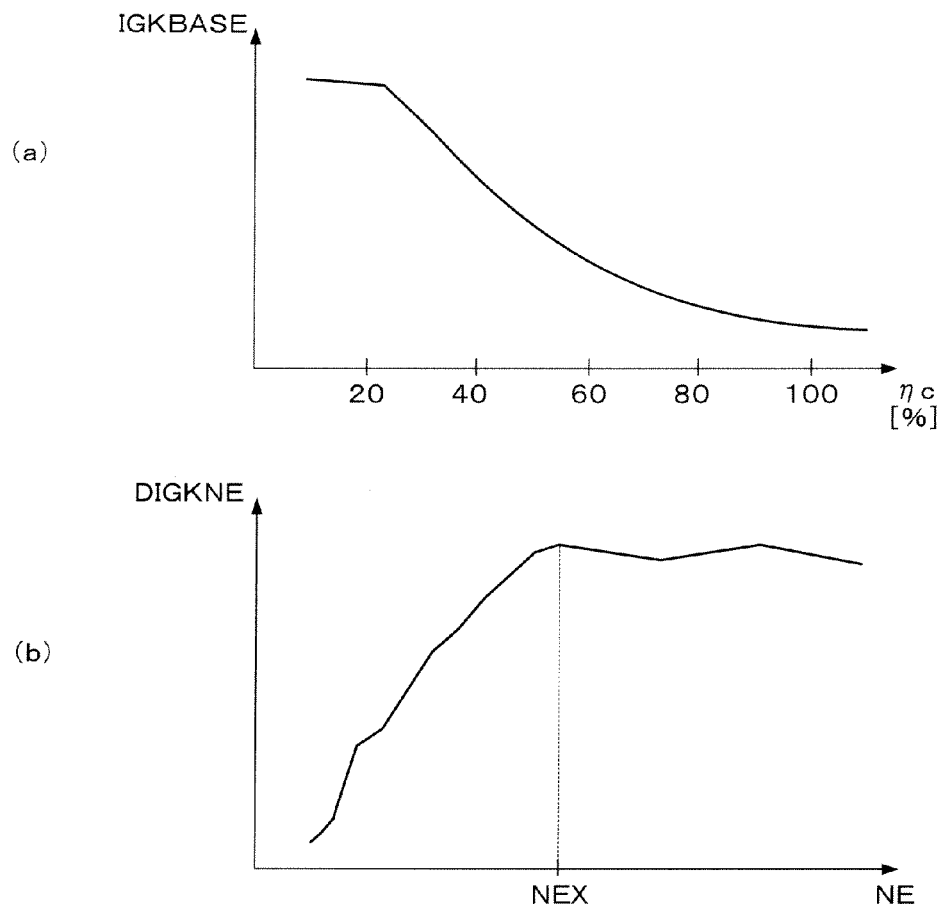
FIG. 10 shows tables referred to in the process of FIG. 9.

In step S31, an IGKBASE table shown in FIG. 10(a) is retrieved according to the charging efficiency $\eta c$ to calculate the basic knock limit ignition timing IGKBASE. The IGKBASE table is set so that the basic knock limit ignition timing IGKBASE decreases as the charging efficiency $\eta c$ increases.

In step S32, a DIGKNE table shown in FIG. 10(b) is retrieved according to the engine rotational speed NE to calculate the rotational speed correction value DIGKNE. The DIGKNE table is set so that the rotational speed correction value DIGKNE increases as the engine rotational speed NE increases in a low rotational speed engine range where the engine rotational speed NE is less than a predetermined rotational speed NEX (e.g., 3000 rpm).

In step S33, the above-described KIGKVTC map is retrieved according to the engine rotational speed NE and the charging efficiency $\eta c$ to calculate a second inclination-coefficient KIGKVTC. In step S34, the valve operating phase VTC and the second inclination-coefficient KIGKVTC are applied to the above-described equation (1) to calculate a second operating phase correction value DIGKVTC.

Figure 14:
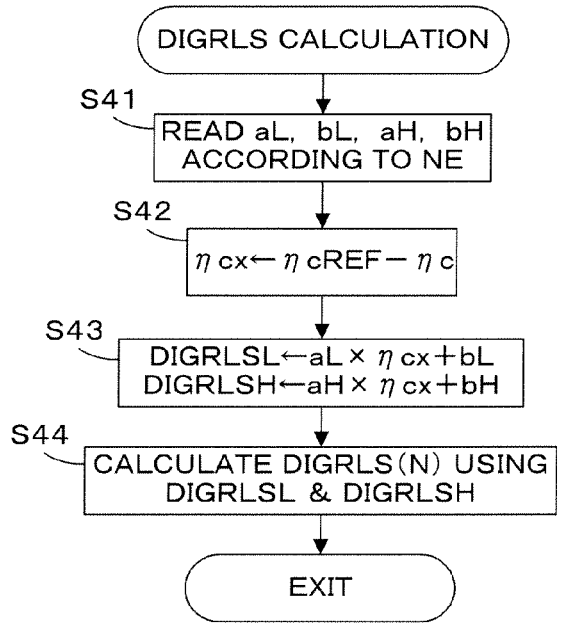
FIG. 14 is a flowchart of a process for calculating the each-cylinder correction value (DIGRLS) in the process of FIG. 9.

In step S35, a DIGRLS calculation process shown in FIG. 14 is executed to calculate an each-cylinder correction value DIGRLS. The each-cylinder correction value DIGRLS is a parameter calculated for each cylinder of the engine, and is also expressed as "DIGRLS (N)". "N" indicates a cylinder number, which takes values of 1 to 4 for the four-cylinder engine, for example. The each-cylinder correction value DIGRLS is a retard correction value which takes a positive value in the retarding direction. For example, when the high-octane number gasoline is used in the regular gasoline engine, the knocking hardly occurs. Therefore, the knock correction value IGKNOCK may exceptionally take a negative value and the each-cylinder correction value DIGRLS may also take a negative value.

In step S36, the basic knock limit ignition timing IGKBASE, the rotational speed correction value DIGKNE, and the second operating phase correction value DIGKVTC are applied to the following equation (7) to calculate the knock limit ignition timing IGKNK.

$$IGKNK = IGKBASE + DIGKNE + DIGKVTC - DIGRLS(N) \qquad (7)$$

Figure 11:
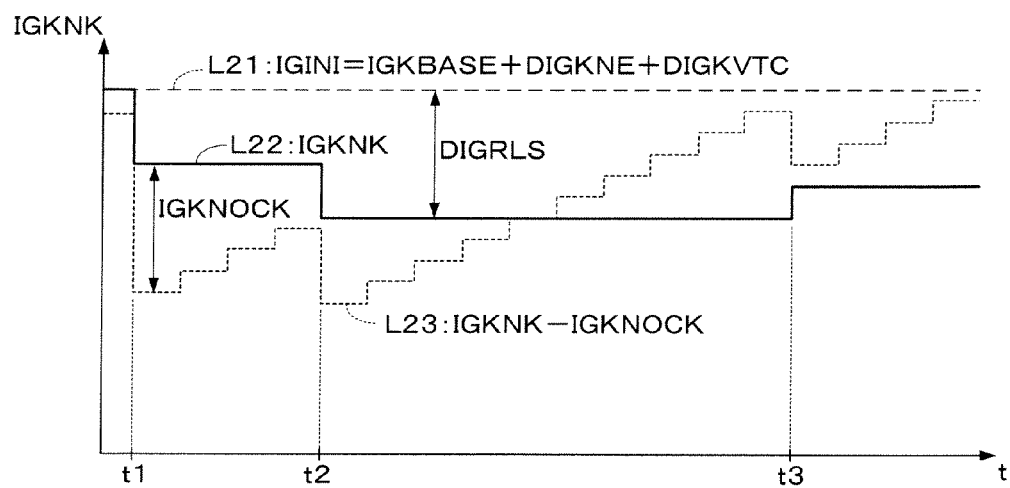
FIG. 11 is a time chart for illustrating the process of FIG. 6.

FIG. 11 is a time chart showing changes in the knock limit ignition timing IGKNK and the related parameters. FIG. 11 shows an example where the knockings are detected at time t1, t2, and t3. The solid line L22 in FIG. 11 corresponds to the knock limit ignition timing IGKNK, and the broken line L21 corresponds to an initial knock limit ignition timing IGINI. The initial knock limit ignition timing IGINI is a parameter which is obtained by adding the each-cylinder correction value DIGRLS to the knock limit ignition timing IGKNK (in other words, the initial knock limit ignition timing IGINI is the knock limit ignition timing IGKNK when the each-cylinder correction value DIGRLS is "0").

The initial knock limit ignition timing IGINI actually changes depending on changes in the engine operating condition. However, FIG. 11 shows, for explanation, a simplified state where the initial knock limit ignition timing IGINI takes a constant value. Further, the broken line L23 shows an ignition timing which is obtained by correcting the knock limit ignition timing IGKNK with the knock correction value IGKNOCK.

The knock correction value IGKNOCK is increased, if the knocking is detected as described above (at t1, t2, and t3), and thereafter gradually decreased. Further, the each-cylinder correction value DIGRLS is a parameter calculated as a learning value of the knock correction value IGKNOCK. If the knocking is detected, first and second learning parameters "a" and "b" which are applied to the calculation of the each-cylinder correction value DIGRLS are updated according to the knock correction value IGKNOCK.

The each-cylinder correction value DIGRLS is described below in detail.

Figure 12:
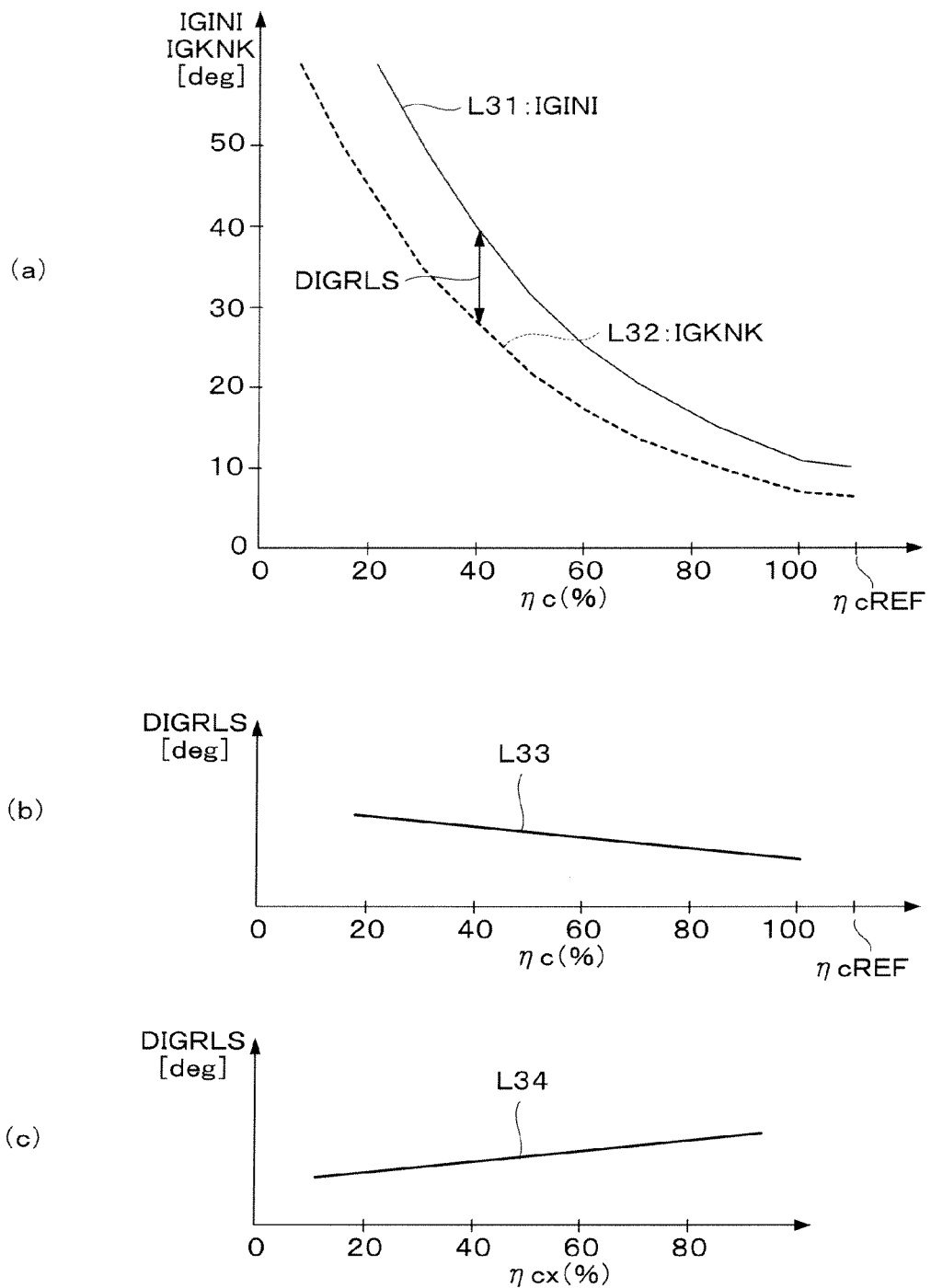
FIG. 12 is a diagram for illustrating an each-cylinder correction value (DIGRLS).

A relationship between the initial knock limit ignition timing IGINI and the charging efficiency ηc, and a relationship between the knock limit ignition timing IGKNK and the charging efficiency ηc are respectively shown by the solid line L31 and the broken line L32 in FIG. 12(a) (the engine rotational speed NE is constant). That is, in FIG. 12(a), the difference between the initial knock limit ignition timing IGINI and the knock limit ignition timing IGKNK corresponds to the each-cylinder correction value DIGRLS. FIG. 12(a) shows an example where the each-cylinder correction value DIGRLS is increased by a certain amount due to aging.

It is empirically confirmed that the relationship between the each-cylinder correction value DIGRLS and the charging efficiency ηc shown in FIG. 12(a) can be approximated by the straight line L33 shown in FIG. 12(b). In this embodiment, the charging efficiency parameter ηcx is defined by the following equation (8), and the straight line L34 shown in FIG. 12(c) is expressed by the following equation (9). In FIG. 12(c), the horizontal axis indicates the charging efficiency parameter ηcx. The coefficient "a" and the adding term "b" of the equation (9), which correspond respectively to the first and second learning parameters, are identified by the sequential least square method.

$$\eta cx = \eta cREF - \eta c \quad (8)$$

$$DIGRLS = a \times \eta cx + b \quad (9)$$

Next, the identifying method of the first and second learning parameters "a" and "b" is described below. At first, the first and second learning parameters "a" and "b" are expressed as a learning parameter vector AB(k) defined by the following equation (10). Further, a variable vector u(k) is defined by the following equation (11). The learning parameter vector AB(k) is calculated by the following equation (12). An index parameter "k" in the following equations (10), (11), and (12) is a parameter which is incremented by "1" when the knocking is detected.

[Eq. 1]

$$AB(k) = \begin{bmatrix} a \\ b \end{bmatrix} \quad (10)$$

$$u(k) = \begin{bmatrix} \eta cx \\ 1 \end{bmatrix} \quad (11)$$

$$AB(k) = AB(k-1) + \frac{P(k-1)u(k)}{1 + u^T(k)P(k-1)u(k)} e(k) \quad (12)$$

In the equation (12), e(k) is an identification error, which is set to the knock correction value IGKNOCK as shown in the following equation (13) when the ignition timing IGLOG is set to the corrected knock limit ignition timing IGKNKM (when the answer to step S17 in FIG. 6 is negative (NO)). On the other hand, the identification error e(k) is calculated by the following equation (14) when the ignition timing IGLOG is set to the optimal ignition timing IGMBT (when the answer to step S17 in FIG. 6 is affirmative (YES)) (refer to steps S51 to S53 in FIG. 16).

$$e(k) = IGKNOCK \quad (13)$$

$$e(k) = IGKNOCK + IGKNKM - IGMBT \quad (14)$$

Figure 13:
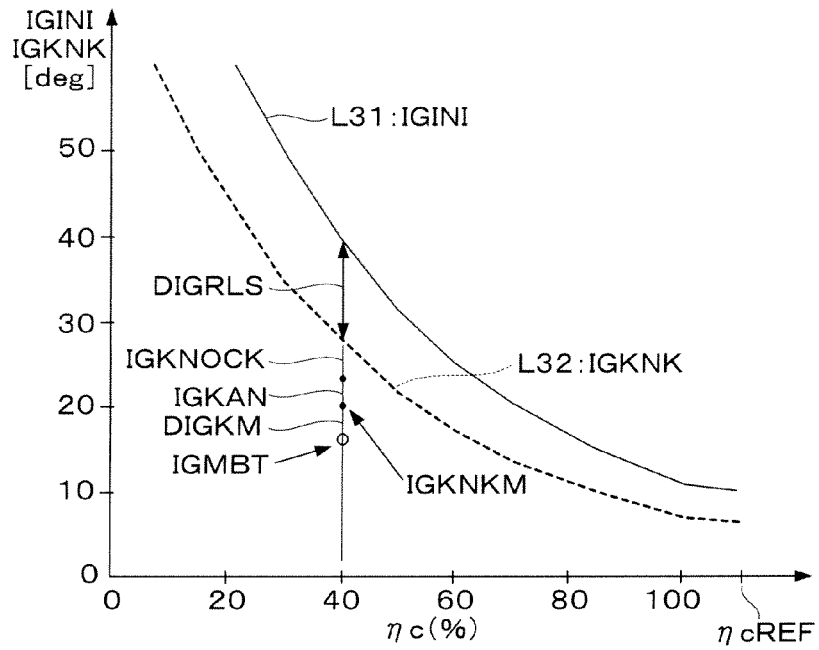
FIG. 13 is a diagram for illustrating a case where the ignition timing (IGLOG) is set to the optimal ignition timing (IGMBT).

When the ignition timing IGLOG is set to the optimal ignition timing IGMBT, the optimal ignition timing IGMBT is on the retard side with respect to the corrected knock limit ignition timing IGKNKM, as shown in FIG. 13. Therefore, when the knocking occurs in this state, it is necessary to set the identification error e(k) to a value obtained by adding the knock correction value IGKNOCK and a difference DIGKM (=IGKNKM−IGMBT) between the optimal ignition timing IGMBT and the corrected knock limit ignition timing IGKNKM. It is to be noted that a value of the knock correction value IGKNOCK applied to calculating the identification error e(k) is a value before the update in the increasing direction corresponding to occurrence of the knocking.

Further, P(k) in the equation (12) is a learning matrix with two rows and two columns as shown in the following equation (15), and calculated by the following equation (16). In the equation (16), "λ" is a weighting parameter which determines the weighting of past values of the learning parameters "a" and "b". "λ" is normally set to a value of about "0.97" to "0.995".

[Eq. 2]

$$P(k) = \begin{bmatrix} P1 & P2 \\ P3 & P4 \end{bmatrix} \quad (15)$$

$$P(k) = \frac{1}{\lambda}\left(P(k-1) - \frac{P(k-1)u(k)u^T(k)P(k-1)}{1/\lambda + u^T(k)P(k-1)u(k)}\right) \quad (16)$$

The above-described learning parameters "a" and "b", and the learning matrix P(k) change depending on the engine rotational speed NE. Therefore, the learning parameters "a" and "b", and the learning matrix P(k) are calculated corresponding to a plurality of predetermined rotational speeds NE1 to NEm ("m" is, for example, set to about "20") for each cylinder and stored in a nonvolatile memory. The table in which the learning parameters "a" and "b" are stored corresponding to each of the predetermined rotational speeds NE1 to NEm will be hereinafter referred to as "learning parameter table".

It is to be noted that initial values of the learning parameters "a" and "b" and the elements in the learning matrix P(k) are set to predetermined values. It is preferable that an initial value P4INI of the element P4 in the learning matrix P(k) is set to a value equal to or greater than an initial value P1INI of the element P1 (P4INI≥P1INI), to make the updating speed of the second learning parameter "b" faster than the updating speed of the first learning parameter "a" at the beginning of the sequential identification calculation. According to this setting, the updating amount of the first learning parameter "a" is prevented from being excessive at the beginning of the sequential identification calculation, which accordingly prevents the each-cylinder correction value DIGRLS from being set to an improper value.

FIG. 14 is a flowchart of the DIGRLS calculation process performed in step S35 of FIG. 9.

In step S41, a lower rotational speed NEL and a higher rotational speed NEH are selected according to the engine rotational speed NE, and a pair of learning parameters aL and bL, and another pair of learning parameters aH and bH are read out from the learning parameter table (corresponding to the controlled-object cylinder in the present calculation). The lower rotational speed NEL is equal to or less than the engine rotational speed NE, and the closest to the engine rotational speed NE. The higher rotational speed NEH is higher than and the closest to the engine rotational speed NE (i.e. the relationship of NEL≤NE<NEH is satisfied). The pair of learning parameters aL and bL corresponds to the selected lower rotational speed NEL, and the pair of learning parameters aH and bH corresponds to the selected higher rotational speed NEH.

In step S42, the charging efficiency parameter ηcx is calculated by the above-described equation (8). In step S43, the charging efficiency parameter ηcx and the pair of learning parameters aL and bL, and the pair of learning parameters aH and bH read out in step S41 are applied to the following equations (21) and (22), to calculate a lower correction value DIGRLSL and a higher correction value DIGRLSH.

$$DIGRLSL = aL \times \eta cx + bL \quad (21)$$

$$DIGRLSH = aH \times \eta cx + bH \quad (22)$$

In step S44, the each-cylinder correction value DIGRLS (N) is calculated with the interpolation of the following equation (23).

[Eq. 3]

$$DIGRLS(N) = \frac{NE - NEL}{NEH - NEL}(DIGRLSH - DIGRLSL) + DIGRLSL \quad (23)$$

Figure 15:
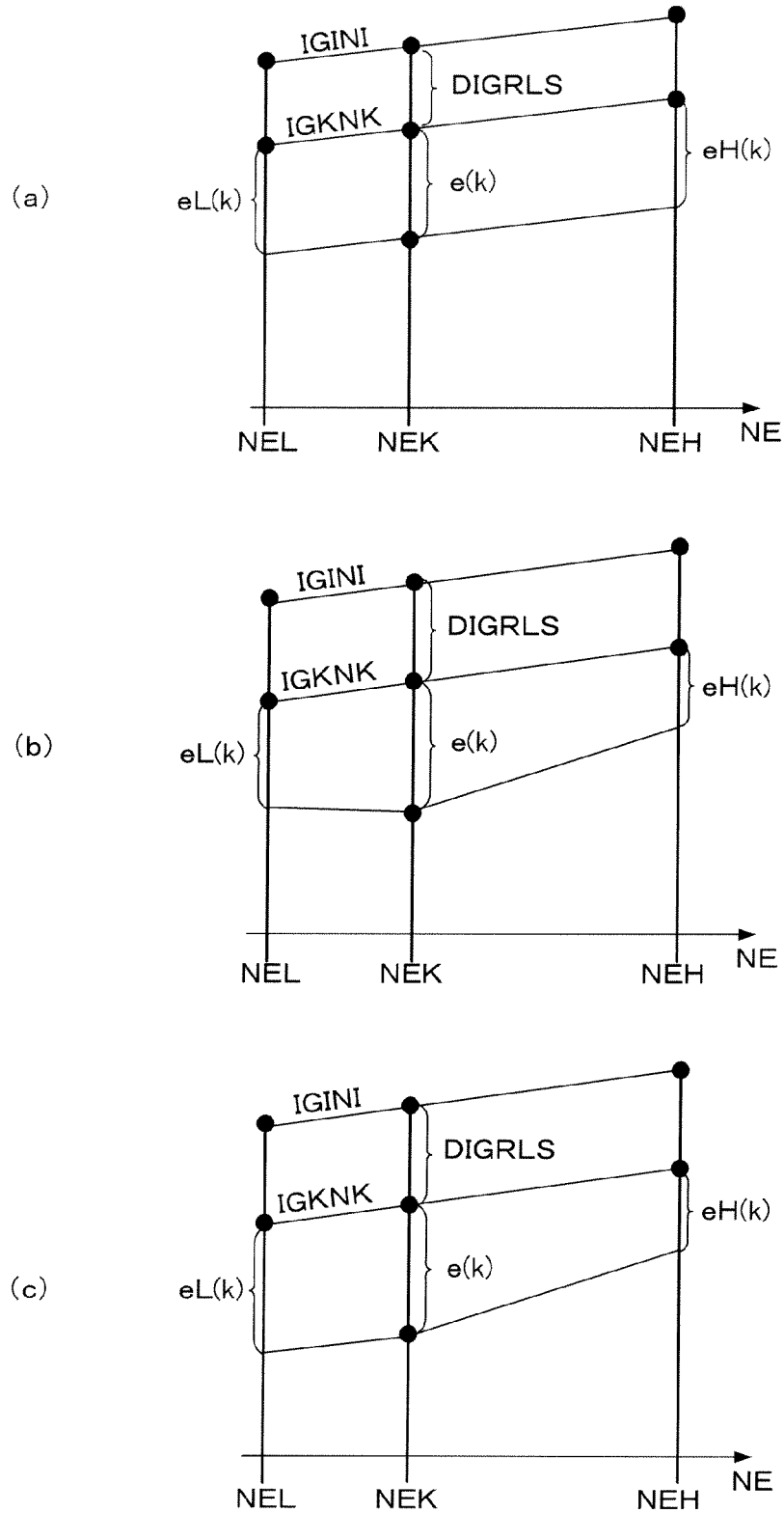
FIG. 15 is a diagram for illustrating a calculation method of identification errors (eL(k), eH(k)) at predetermined rotational speeds (NEL, NEH).

Next, the updating method of the learning parameter table is described below with reference to FIG. 15. The update of the learning parameter table is performed when the knocking is detected. Therefore, the engine rotational speed NE at the time the knocking is detected is hereinafter referred to as "knocking rotational speed NEK". The identification error e(k) at the knocking rotational speed NEK is equal to the knock correction value IGKNOCK (or IGKNOCK+(IGKNKM−IGMBT)) of the time. Accordingly, it is necessary to calculate a lower identification error eL(k) and a higher identification error eH(k) which correspond respectively to the lower rotational speed NEL and the higher rotational speed NEH, according to the identification error e(k). Three methods shown in FIGS. 15(a) to 15(c) can be applied to the calculation of eL(k) and eH(k).

The first method shown in FIG. 15(a) is a method in which the identification error e(k) at the knocking rotational speed NEK is used as shown by the following equations (23) and (24).

$$eL(k) = e(k) \quad (23)$$

$$eH(k) = e(k) \quad (24)$$

The second method shown in FIG. 15(b) is a method in which the lower identification error eL(k) and the higher identification error eH(k) are respectively calculated by the following equations (25) and (26). That is, a difference DNEL between the knocking rotational speed NEK and the lower rotational speed NEL (=NEK−NEL) and a difference DNEH between the knocking rotational speed NEK and the higher rotational speed NEH (=NEH−NEK) are calculated. The lower identification error eL(k) and the higher identification error eH(k) are calculated by the proportional distribution method according to the differences DNEL and DNEH (hereinafter referred to as "lower difference DNEL" and "higher difference DNEH").

$$eL(k) = DNEH \times e(k)/(NEH - NEL) \quad (25)$$

$$eH(k) = DNEL \times e(k)/(NEH - NEL) \quad (26)$$

The third method shown in FIG. 15(c) is a method in which the lower identification error eL(k) and the higher identification error eH(k) are respectively calculated by the following equations (27) and (28), or (29) and (30) according to a magnitude relationship between the lower difference DNEL and the higher DNEH. In the equations (28) and (29), "PRLS" is a predetermined coefficient which is empirically set.

1) When DNEH is greater than DNEL $$eL(k) = e(k) \quad (27)$$

$$eH(k) = PRLS \times DNEL \times e(k)/(NEH - NEL) \quad (28)$$

2) When DNEH is equal to or less than DNEL $$eL(k) = PRLS \times DNEH \times e(k)/(NEH - NEL) \quad (29)$$

$$eH(k) = e(k) \quad (30)$$

It is preferable to use the second method when preset intervals DNEDV of the predetermined rotational speeds NE1 to NEm are constant. It is preferable to use the first method when the preset intervals DNEDV are not constant, and are equal to or less than 200 rpm. Further, it is preferable to use the third method when the preset intervals DNEDV are not constant, and are greater than 200 rpm.

Figure 16:
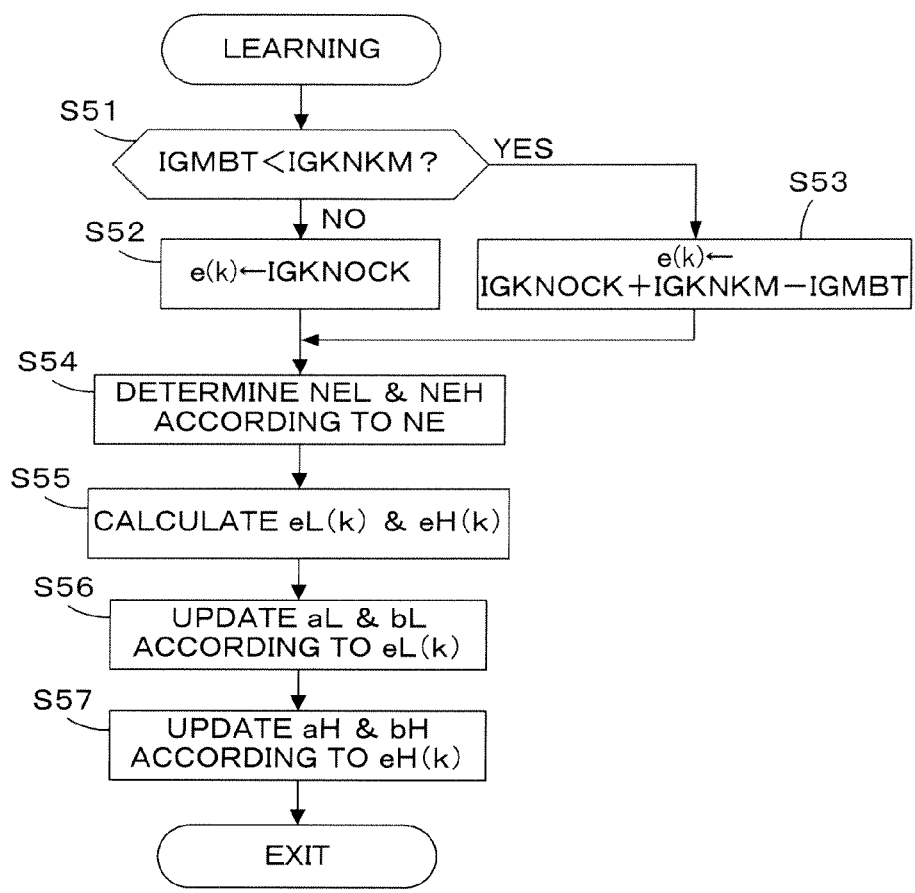
FIG. 16 is a flowchart of a learning process for updating learning parameters (aL, bL, aH, bH).

FIG. 16 is a flowchart of the learning process for updating the learning parameter table described above. This process is executed immediately after the knocking is detected.

In step S51, it is determined whether or not the optimal ignition timing IGMBT is less than the corrected knock limit ignition timing IGKNKM. If the answer to step S51 is negative (NO), the identification error e(k) is set to the knock correction value IGKNOCK (step S52). On the other hand, if IGMBT is less than IGKNKM, the identification error e(k) is calculated by the above-described equation (14) (step S53).

In step S54, the lower rotational speed NEL and the higher rotational speed NEH are determined according to the engine rotational speed NE. In step S55, the lower identification error eL(k) and the higher identification error eH(k) are calculated by applying any one of the above-described three calculation methods.

In step S56, the lower identification error eL(k) is applied to e(k) of the equation (12) to update a learning parameter vector ABL(k) corresponding to the lower rotational speed NEL, i.e., the first and second learning parameters aL and bL are updated. At the same time, the corresponding learning matrix P(k) is also updated (equation (16)).

In step S57, the higher identification error eH(k) is applied to e(k) of the equation (12), to update a learning parameter vector ABH(k) corresponding to the higher rotational speed NEH, i.e., the first and second learning parameters aH and bH are updated. At the same time, the corresponding learning matrix P(k) is also updated (equation (16)).

As described above, the learning parameter table corresponding to the cylinder in which the knocking has occurred is updated.

According to this embodiment, the charging efficiency ηc is calculated according to the intake air flow rate GAIR and the engine rotational speed NE, and the initial knock limit ignition timing IGINI (=IGKBASE+DIGKNE+DIGKVTC) is calculated according to the engine rotational speed NE and the charging efficiency ηc. Further, the knocking of the engine 1 is detected, and the knock correction value IGKNOCK is calculated according to the detected result of the knocking. The learning parameter table, in which the first and second learning parameters "a" and "b" are set, is updated based on the engine rotational speed NE and the knock correction value IGKNOCK when the knocking is detected. The first and second learning parameters "a" and "b" are calculated by retrieving the learning parameter table according to the engine rotational speed NE. The each-cylinder correction values DIGRLS(N) respectively corresponding to the plurality of cylinders in the engine 1 are calculated using the charging efficiency ηc, the first learning parameters "a", and the second learning parameter "b". The ignition timing IGLOG is calculated using the initial knock limit ignition timing IGINI and the each-cylinder correction value DIGRLS(N). Therefore, the learning parameter table, in which the first and second learning parameters "a" and "b" are set, is updated according to the state of knocking occurrence, so that differences in the knock limit ignition timing IGKNK among a plurality of cylinders or engines, or changes in the knock limit ignition timing IGKNK due to aging are reflected in the first and second learning parameters. Consequently, the ignition timing IGLOG can appropriately be set regardless of the differences or aging changes in the knock limit ignition timing IGKNK so that the knocking is always suppressed.

Further, the each-cylinder correction value DIGRLS is calculated by applying the charging efficiency parameter ηcx, which is a difference between the reference value ηcREF of the charging efficiency ηc and the charging efficiency ηc, to the equation (9) which is a linear expression containing the first and second learning parameters "a" and "b". It is confirmed that the influence due to the differences or aging changes tends to be greater as the charging efficiency ηc decreases under the condition where the engine rotational speed NE is constant, and the each-cylinder correction value DIGRLS for correcting the differences or aging changes can be calculated using the linear expression (9) of the charging efficiency parameter ηcx. Therefore, by calculating the first and second learning parameters "a" and "b" as the coefficient and the adding term which define the equation (9), and using the linear expression (9) containing the first and second learning parameters "a" and "b", a proper value of the each-cylinder correction value DIGRLS can be obtained.

Further, the reference value ηcREF of the charging efficiency ηc is set to a value which is greater than 100% (e.g., 110%). The charging efficiency ηc calculated during the engine operation may reach a value near 100%. If the reference value ηcREF is set to 100%, the values of the learning parameters "a" and "b" may greatly deviates from proper values when the charging efficiency ηc takes a great value at the beginning of learning the learning parameters "a" and "b". Therefore, by setting the reference value ηcREF of the charging efficiency ηc to a value greater than 100%, it is possible to maintain the learning parameter values at the proper values especially at the beginning of the learning.

Further, the basic knock limit ignition timing IGKBASE is calculated according to the charging efficiency ηc, the rotational speed correction value DIGKNE is calculated according to the engine rotational speed NE, and the inclination coefficient KIGKVTC is calculated according to the charging efficiency ηc and the engine rotational speed NE. Further, the operating phase VTC of the intake valve is multiplied by the inclination coefficient KIGKVTC, to calculate the operating phase correction value DIGKVTC, and the basic knock limit ignition timing IGKBASE is corrected with the rotational speed correction value DIGKNE and the operating phase correction value DIGKVTC, to calculate the initial knock limit ignition timing IGINI. That is, it is possible to calculate the initial knock limit ignition timing IGINI using two tables and one map (the inclination coefficient map). Therefore, the control accuracy can be maintained without setting a plurality of basic knock limit ignition timing maps corresponding to a plurality of operating phases of the intake valve. Consequently, the manpower required for setting maps is greatly reduced.

In this embodiment, the intake air flow rate sensor 13 corresponds to the intake air flow rate detecting means, the crank angle position sensor 11 corresponds to the rotational speed detecting means, and the knock sensor 11 and the ECU 5 constitute the knocking detecting means. Further, the ECU 5 constitutes the charging efficiency calculating means, the knock limit ignition timing calculating means, the knock correction value calculating means, the learning means, the learning parameter calculating means, the each-cylinder correction value calculating means, the ignition timing calculating means, the basic knock limit ignition timing calculating means, the rotational speed correction value calculating means, the inclination coefficient calculating means, and the operating phase correction value calculating means. Specifically, the process of FIG. 7 corresponds to the charging efficiency calculating means, the process of FIG. 9 corresponds to the knock limit ignition timing calculating means, step S14 in FIG. 6 corresponds to the knock correction value calculating means, the process of FIG. 16 corresponds to the learning means, step S41 in FIG. 14 corresponds to the learning parameter calculating means, the process of FIG. 14 corresponds to the each-cylinder correction value calculating means, steps S16 to S19 in FIG. 6 correspond to the ignition timing calculating means, step S31 in FIG. 9 corresponds to the basic knock limit ignition timing calculating means, step S32 corresponds to the rotational speed correction value calculating means, step S33 corresponds to the inclination coefficient calculating means, and step S34 corresponds to the operating phase correction value calculating means.

The present invention is not limited to the embodiment described above, and various modifications may be made. For example, in the above-described embodiment, the controlled object is an engine having a valve operating characteristic varying mechanism for continuously varying the operating phase of the intake valve. The present invention is also applicable to a control of an ordinary engine having intake valves of the fixed operating phase. In such modification, steps S26 and S27 in FIG. 8 are deleted, and the optimal ignition timing IGMBT is set to the basic optimal ignition timing IGMBTB.

Further, steps S33 and S34 in FIG. 9 are deleted, and the knock limit ignition timing IGKNK is calculated by the following equation (7a). Therefore, the initial knock limit ignition timing IGINI is calculated by the following equation (7b).

$$IGKNK = IGKBASE + DIGKNE - DIGRLS(N) \qquad (7a)$$

$$IGINI = IGKBASE + DIGKNE \qquad (7b)$$

Further, the present invention can be applied to an ignition timing control for a watercraft propulsion engine such as an outboard engine having a vertically extending crankshaft.

DESCRIPTION OF REFERENCE NUMERALS

1 Internal combustion engine
5 Electronic control unit (charging efficiency calculating means, knock limit ignition timing calculating means, knocking detecting means, knock correction value calculating means, learning means, learning parameter calculating means, each-cylinder correction value calculating means, ignition timing calculating means, basic knock limit ignition timing calculating means, rotational speed correction value calculating means, inclination coefficient calculating means, operating phase correction value calculating means)

11 Crank angle position sensor (rotational speed detecting means)

12 Cam angle position sensor

13 Intake air flow rate sensor (intake air flow rate detecting means)

14 Knock sensor (knocking detecting means)

The invention claimed is:

1. An ignition timing control system for an internal combustion engine, for controlling an ignition timing of said engine, said ignition timing control system being characterized by comprising:
   intake air flow rate detecting means for detecting an intake air flow rate of said engine;
   rotational speed detecting means for detecting a rotational speed of said engine;
   charging efficiency calculating means for calculating a charging efficiency of said engine according to the intake air flow rate and the engine rotational speed which are detected;
   knock limit ignition timing calculating means for calculating a knock limit ignition timing according to the engine rotational speed and the charging efficiency;
   knocking detecting means for detecting a knocking of said engine;
   knock correction value calculating means for calculating a knock correction value according to the detected result by said knocking detecting means;
   learning means for updating a learning parameter table based on the engine rotational speed and the knock correction value when the knocking is detected, wherein first and second learning parameters are set in the learning parameter table;
   learning parameter calculating means for retrieving the learning parameter table according to the engine rotational speed, to calculate the first and second learning parameters;
   each-cylinder correction value calculating means for calculating each-cylinder correction values corresponding respectively to a plurality of cylinders of said engine using the charging efficiency, the first learning parameter, and the second learning parameter; and
   ignition timing calculating means for calculating an ignition timing of said engine using the knock limit ignition timing and the each-cylinder correction value,
   wherein first and second learning parameters indicate a relationship between the charging efficiency and the each-cylinder correction value.

2. An ignition timing control system according to claim 1, wherein said each-cylinder correction value calculating means calculates the each-cylinder correction value by applying a difference between the charging efficiency and a reference value of the charging efficiency, to a linear expression containing the first and second learning parameters.

3. An ignition timing control system according to claim 2, wherein the reference value is set to a value greater than 100%.

4. An ignition timing control system according to claim 1, wherein said knock limit ignition timing calculating means includes:

basic knock limit ignition timing calculating means for calculating a basic knock limit ignition timing according to the charging efficiency; and
rotational speed correction value calculating means for calculating a rotational speed correction value according to the engine rotational speed,
wherein said knock limit ignition timing calculating means calculates the knock limit ignition timing by correcting the basic knock limit ignition timing with the rotational speed correction value.

5. An ignition timing control system according to claim 1, wherein said engine has a valve operating characteristic varying mechanism for continuously varying an operating phase of at least one intake valve of said engine, and
said knock limit ignition timing calculating means includes:
basic knock limit ignition timing calculating means for calculating a basic knock limit ignition timing according to the charging efficiency;
rotational speed correction value calculating means for calculating a rotational speed correction value according to the engine rotational speed;
inclination coefficient calculating means for calculating an inclination coefficient according to the charging efficiency and the engine rotational speed; and
operating phase correction value calculating means for calculating an operating phase correction value by multiplying an operating phase of the at least one intake valve by the inclination coefficient,
wherein said knock limit ignition timing calculating means calculates the knock limit ignition timing by correcting the basic knock limit ignition timing with the rotational speed correction value and the operating phase correction value.

6. An ignition timing control method for an internal combustion engine, for controlling an ignition timing of said engine, said ignition timing control method being characterized by comprising the steps of:
a) detecting an intake air flow rate of said engine;
b) detecting a rotational speed of said engine;
c) calculating a charging efficiency of said engine according to the intake air flow rate and the engine rotational speed which are detected;
d) calculating a knock limit ignition timing according to the engine rotational speed and the charging efficiency;
e) detecting a knocking of said engine;
f) calculating a knock correction value according to the detected result by said step e);
g) updating a learning parameter table based on the engine rotational speed and the knock correction value when the knocking is detected, wherein first and second learning parameters are set in the learning parameter table;
h) retrieving the learning parameter table according to the engine rotational speed, to calculate the first and second learning parameters;
i) calculating each-cylinder correction values corresponding respectively to a plurality of cylinders of said engine using the charging efficiency, the first learning parameter, and the second learning parameter; and
j) calculating an ignition timing of said engine using the knock limit ignition timing and the each-cylinder correction value,
wherein the first and second learning parameters indicate a relationship between the charging efficiency and the each-cylinder correction value.

7. An ignition timing control method according to claim 6, wherein the each-cylinder correction value is calculated by applying a difference between the charging efficiency and a reference value of the charging efficiency, to a linear expression containing the first and second learning parameters.

8. An ignition timing control method according to claim 7, wherein the reference value is set to a value greater than 100% in said step i).

9. An ignition timing control method according to claim 6, wherein said step d) includes:
  k) calculating a basic knock limit ignition timing according to the charging efficiency; and
  l) calculating a rotational speed correction value according to the engine rotational speed,
  wherein the knock limit ignition timing is calculated in said step d) by correcting the basic knock limit ignition timing with the rotational speed correction value.

10. An ignition timing control method according to claim 6, wherein said engine has a valve operating characteristic varying mechanism for continuously varying an operating phase of at least one intake valve of said engine, and
  said step d) includes:
  m) calculating a basic knock limit ignition timing according to the charging efficiency;
  n) calculating a rotational speed correction value according to the engine rotational speed;
  o) calculating an inclination coefficient according to the charging efficiency and the engine rotational speed; and
  p) calculating an operating phase correction value by multiplying an operating phase of the at least one intake valve by the inclination coefficient,
  wherein the knock limit ignition timing is calculated in said step d) by correcting the basic knock limit ignition timing with the rotational speed correction value and the operating phase correction value.

11. A computer program embodied on a computer-readable storage medium for causing a computer to implement an ignition timing control method for an internal combustion engine, for controlling an ignition timing of said engine, said ignition timing control method being characterized by comprising the steps of:
  a) detecting an intake air flow rate of said engine;
  b) detecting a rotational speed of said engine;
  c) calculating a charging efficiency of said engine according to the intake air flow rate and the engine rotational speed which are detected;
  d) calculating a knock limit ignition timing according to the engine rotational speed and the charging efficiency;
  e) detecting a knocking of said engine;
  f) calculating a knock correction value according to the detected result by said step e);
  g) updating a learning parameter table based on the engine rotational speed and the knock correction value when the knocking is detected, wherein first and second learning parameters are set in the learning parameter table;
  h) retrieving the learning parameter table according to the engine rotational speed, to calculate the first and second learning parameters;
  i) calculating each-cylinder correction values corresponding respectively to a plurality of cylinders of said engine using the charging efficiency, the first learning parameter, and the second learning parameter; and
  j) calculating an ignition timing of said engine using the knock limit ignition timing and the each-cylinder correction value,
  wherein the first and second learning parameters indicate a relationship between the charging efficiency and the each-cylinder correction value.

12. A computer program according to claim 11, wherein the each-cylinder correction value is calculated by applying a difference between the charging efficiency and a reference value of the charging efficiency, to a linear expression containing the first and second learning parameters.

13. A computer program according to claim 12, wherein the reference value is set to a value greater than 100% in said step i).

14. A computer program according to claim 11, wherein said step d) includes:
  k) calculating a basic knock limit ignition timing according to the charging efficiency; and
  l) calculating a rotational speed correction value according to the engine rotational speed,
  wherein the knock limit ignition timing is calculated in said step d) by correcting the basic knock limit ignition timing with the rotational speed correction value.

15. A computer program according to claim 11, wherein said engine has a valve operating characteristic varying mechanism for continuously varying an operating phase of at least one intake valve of said engine, and
  said step d) includes:
  m) calculating a basic knock limit ignition timing according to the charging efficiency;
  n) calculating a rotational speed correction value according to the engine rotational speed;
  o) calculating an inclination coefficient according to the charging efficiency and the engine rotational speed; and
  p) calculating an operating phase correction value by multiplying an operating phase of the at least one intake valve by the inclination coefficient,
  wherein the knock limit ignition timing is calculated in said step d) by correcting the basic knock limit ignition timing with the rotational speed correction value and the operating phase correction value.

* * * * *